(12) United States Patent
Silver et al.

(10) Patent No.: US 11,887,474 B2
(45) Date of Patent: *Jan. 30, 2024

(54) DETECTING AND RESPONDING TO TRAFFIC REDIRECTION FOR AUTONOMOUS VEHICLES

(71) Applicant: Waymo LLC, Mountain View, CA (US)

(72) Inventors: David Harrison Silver, San Carlos, CA (US); Pankaj Chaudhari, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 580 days.

This patent is subject to a terminal disclaimer.

(21) Appl. No.: 16/896,845

(22) Filed: Jun. 9, 2020

(65) Prior Publication Data

US 2020/0365016 A1 Nov. 19, 2020

Related U.S. Application Data

(63) Continuation of application No. 15/798,881, filed on Oct. 31, 2017, now Pat. No. 10,713,940.

(51) Int. Cl.
*G08G 1/01* (2006.01)
*G05D 1/02* (2020.01)
(Continued)

(52) U.S. Cl.
CPC ......... *G08G 1/0145* (2013.01); *G05D 1/0088* (2013.01); *G05D 1/0214* (2013.01);
(Continued)

(58) Field of Classification Search
CPC .. G08G 1/0145; G08G 1/056; G08G 1/09623; G08G 1/096811;
(Continued)

(56) References Cited

U.S. PATENT DOCUMENTS

| 5,764,283 A | 6/1998 | Pingali et al. |
| 7,526,377 B2 | 4/2009 | Wiener et al. |
| (Continued) | | |

FOREIGN PATENT DOCUMENTS

| CN | 102227612 A | 10/2011 |
| CN | 106103232 A | 11/2016 |
| (Continued) | | |

OTHER PUBLICATIONS

International Search Report and Written Opinion for Application No. PCT/US2018/057992 dated Feb. 20, 2019.

(Continued)

*Primary Examiner* — Nga X Nguyen
(74) *Attorney, Agent, or Firm* — Botos Churchill IP Law LLP

(57) ABSTRACT

The technology relates to controlling a vehicle in an autonomous driving mode, the method. For instance, a vehicle may be maneuvered in the autonomous driving mode using pre-stored map information identifying traffic flow directions. Data may be received from a perception system of the vehicle identifying objects in an external environment of the vehicle related to a traffic redirection not identified the map information. The received data may be used to identify one or more corridors of a traffic redirection. One of the one or more corridors may be selected based on a direction of traffic flow through the selected corridor. The vehicle may then be controlled in the autonomous driving mode to enter and follow the selected one of the one or more corridors based on the determined direction of flow of traffic through each of the one or more corridors.

18 Claims, 13 Drawing Sheets

(51) Int. Cl.
  *G05D 1/00* (2006.01)
  *G06K 9/00* (2022.01)
  *G06V 20/58* (2022.01)
  *G06V 20/56* (2022.01)

(52) U.S. Cl.
  CPC ............ *G06V 20/58* (2022.01); *G06V 20/588* (2022.01); *G06T 2207/30236* (2013.01); *G06T 2207/30256* (2013.01)

(58) Field of Classification Search
  CPC .......... G08G 1/096827; G05D 1/0088; G05D 1/0214; G05D 2201/0213; G05D 1/0212; G05D 1/0246; G05D 1/0231; G05D 1/0289; G05D 1/0274; G05D 2201/0212; G06V 20/58; G06V 20/588; G06T 2207/30236; G06T 2207/30256; G01C 21/3415; G01C 21/3658; B60W 30/14
  See application file for complete search history.

(56) References Cited

U.S. PATENT DOCUMENTS

| | | | |
|---|---|---|---|
| 7,880,621 B2 | 2/2011 | Kalik | |
| 8,085,140 B2 | 12/2011 | Mochizuki et al. | |
| 8,694,236 B2 | 4/2014 | Takagi | |
| 8,880,272 B1 | 11/2014 | Ferguson et al. | |
| 8,996,286 B1 * | 3/2015 | Klein | G08G 1/0112 701/119 |
| 9,110,163 B2 | 8/2015 | Rogan | |
| 9,213,337 B1 | 12/2015 | Ferguson | |
| 9,315,192 B1 | 4/2016 | Zhu et al. | |
| 9,335,178 B2 | 5/2016 | Nickolaou | |
| 9,355,562 B1 | 5/2016 | Ferguson | |
| 9,489,601 B2 * | 11/2016 | Fairfield | B60W 30/10 |
| 9,503,860 B1 | 11/2016 | Mankovskii et al. | |
| 9,566,986 B1 | 2/2017 | Gordon et al. | |
| 9,576,185 B1 | 2/2017 | Delp | |
| 9,600,768 B1 | 3/2017 | Ferguson | |
| 10,235,768 B2 | 3/2019 | Sasaki | |
| 2007/0244627 A1 | 10/2007 | Boss et al. | |
| 2010/0106356 A1 | 4/2010 | Trepagnier et al. | |
| 2010/0134626 A1 | 6/2010 | Icho et al. | |
| 2012/0116662 A1 | 5/2012 | Zeng et al. | |
| 2012/0294540 A1 | 11/2012 | Sun et al. | |
| 2013/0016877 A1 | 1/2013 | Feris et al. | |
| 2014/0003706 A1 | 1/2014 | Datta | |
| 2014/0003708 A1 | 1/2014 | Datta et al. | |
| 2014/0029851 A1 | 1/2014 | Tai et al. | |
| 2014/0029852 A1 | 1/2014 | Pisipati et al. | |
| 2014/0067187 A1 | 3/2014 | Ferguson et al. | |
| 2014/0368807 A1 | 12/2014 | Rogan | |
| 2015/0254986 A1 | 9/2015 | Fairfield et al. | |
| 2015/0266472 A1 | 9/2015 | Ferguson et al. | |
| 2015/0378361 A1 | 12/2015 | Walker et al. | |
| 2016/0046290 A1 | 2/2016 | Aharony et al. | |
| 2016/0132705 A1 | 5/2016 | Kovarik et al. | |
| 2017/0024875 A1 | 1/2017 | Ishigami et al. | |
| 2017/0043768 A1 | 2/2017 | Prokhorov | |
| 2017/0045885 A1 | 2/2017 | Okumura et al. | |
| 2017/0113686 A1 | 4/2017 | Horita et al. | |
| 2017/0122749 A1 | 5/2017 | Urano et al. | |
| 2017/0151943 A1 | 6/2017 | Goto | |
| 2017/0178352 A1 | 6/2017 | Harmsen et al. | |
| 2017/0212518 A1 | 7/2017 | Iimura et al. | |
| 2017/0282916 A1 | 10/2017 | Remillard et al. | |
| 2017/0301107 A1 | 10/2017 | Sasaki | |
| 2018/0047292 A1 * | 2/2018 | Hashimoto | G06V 20/588 |
| 2018/0061232 A1 * | 3/2018 | Madigan | H04W 4/50 |
| 2018/0075309 A1 | 3/2018 | Sathyanarayana et al. | |
| 2018/0141562 A1 | 5/2018 | Singhal | |
| 2018/0189601 A1 | 7/2018 | Dabeer et al. | |
| 2018/0194280 A1 * | 7/2018 | Shibata | G01C 21/3484 |
| 2018/0252539 A1 | 9/2018 | Yunoki et al. | |
| 2018/0259957 A1 | 9/2018 | Charrow et al. | |
| 2018/0375568 A1 * | 12/2018 | De Rosa | G08G 5/0069 |
| 2019/0064810 A1 | 2/2019 | Jiang et al. | |
| 2019/0311614 A1 | 10/2019 | Yang et al. | |

FOREIGN PATENT DOCUMENTS

| | | |
|---|---|---|
| CN | 106458218 A | 2/2017 |
| CN | 106940933 A | 7/2017 |
| CN | 206300797 U | 7/2017 |
| CN | 107004363 A | 8/2017 |
| CN | 107272687 A | 10/2017 |
| DE | 102016218876 A1 | 3/2018 |
| EP | 2338029 B1 | 5/2017 |
| JP | 2000321081 A | 11/2000 |
| JP | 2007310595 A | 11/2007 |
| JP | 2010003157 A | 1/2010 |
| JP | 5171629 B2 | 1/2013 |
| JP | 2016092650 A | 5/2016 |
| JP | 2017055177 A | 3/2017 |
| KR | 101621649 B1 | 5/2016 |
| WO | 2012150591 A2 | 11/2012 |
| WO | WO2012150591 A2 | 11/2012 |
| WO | 2016092650 A1 | 6/2016 |
| WO | 2017145314 A1 | 8/2017 |

OTHER PUBLICATIONS

"International Search Report and Written Opinion received for PCT Patent Application No. PCT/US2018/057971, dated Feb. 25, 2019", 9 pages.
Similarity threshold, Accessed Oct. 2021, https://www.ibm.com/docs/en/db2/9.7?topic=clustering-similarity-threshold (Year: 2021).
Shirkhorshidi , et al., "A Comparison Study on Similarity and Dissimilarity Measures in Clustering Continuous Data", Shirkhorshidi AS, Aghabozorgi S, Wah TY (2015) PLOS ONE 10(12): e0144059. https://doi.org/10.1371/journal.pone.0144059 (Year: 2015).
Preliminary Rejection for Korean Patent Application No. 10-2020-7012260, dated Sep. 27, 2021.
Preliminary Rejection for Korean Patent Application No. 10-2020-7012452, dated Sep. 27, 2021.
Reference Guide to Work Zone Traffic Control, Texas Engineering Extension Service, 2011, pp. 1-65.
The Extended European Search Report for European Patent Application No. 18872258.1, dated Aug. 20, 2021.
The Decision to Grant for Japanese Patent Application No. 2020-520748, dated May 18, 2022.
European Search Report for Application No. EP18874467 dated May 14, 2021.
Japanese Office Action for Patent Application No. 2020-520748, dated Aug. 2, 2021.
"Invitation to Respond to Written Opinion for Singapore Patent Application No. 11202003335Y dated Apr. 13, 2021", Intellectual Property Office of Singapore.
"Invitation to Respond to Written Opinion for Singapore Patent Application No. 11202003366S dated Apr. 13, 2021", Intellectual Property Office of Singapore.
Cohen , et al., "Learning to Match and Cluster Large High-Dimensional Data Sets For Data Integration", Copyright 2002 ACM 1-58113-567-X/02/0007.
Morioka , et al., "Building Compact Local Pairwise Codebook With Joint Feature Space Clustering", 2010, pp. 692-705.
Notice of Reasons for Rejection for Japanese Patent Application No. 2020-520739, dated Jul. 13, 2021.
Australian Examination Report No. 1 for Application No. 2018358932 dated Oct. 6, 2020.
Australian Examination Report No. 1 for Application No. 2018361251 dated Oct. 9, 2020.
Australian Examination Report No. 2 for Application No. 2018361251 dated Nov. 6, 2020.
The First Office Action for Chinese Patent Application No. 201880070807.9, dated Dec. 19, 2022.
Communication Under Rule 71(3) EPC, Intention to Grant for European Patent Application No. 18874467.6, dated Apr. 5, 2023, 39 Pages.

(56) References Cited

OTHER PUBLICATIONS

First Office Action in CN Application No. 201880070898.6, dated Dec. 8, 2020 (with English Translation) 15 pages.

* cited by examiner

DETECTING AND RESPONDING TO TRAFFIC REDIRECTION FOR AUTONOMOUS VEHICLES

CROSS REFERENCE TO RELATED APPLICATIONS

The present application is a continuation of U.S. patent application Ser. No. 15/798,881, filed Oct. 31, 2017, which is related to co-pending application Ser. No. 15/798,926, filed Oct. 31, 2017, the entire disclosures of which are incorporated by reference herein.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location.

Robust operation of an autonomous vehicle or a vehicle operating in an autonomous driving mode requires proper response to unexpected circumstances, such as construction that alters the normal flow of traffic. In other words, the flow of traffic may be redirected temporarily due to construction or a traffic incident. For instance, lanes may be closed by blocking the lane with an object such as an emergency vehicle, construction sign, cones, barrels or other objects. At the same time, other lanes may remain open and/or cones or other markers have been used to create new corridors that separate new "lanes" or opposing traffic. In many instances, the features which mark the redirection, such as cones or emergency vehicles will not be previously recorded in the maps used by the vehicle's control computing devices to navigate the vehicle. Accordingly, for safe and effective control, identifying and responding to such circumstances is a critical function for these vehicles.

BRIEF SUMMARY

One aspect of the disclosure provides a method of controlling a vehicle in an autonomous driving mode. The method includes maneuvering, by one or more processors, a vehicle in the autonomous driving mode using pre-stored map information identifying traffic flow directions; receiving, by the one or more processors, data from a perception system of the vehicle identifying objects in an external environment of the vehicle related to a traffic redirection not identified the map information; using, by the one or more processors, the received data to identify one or more corridors of a traffic redirection; selecting, by the one or more processors, one of the one or more corridors based on a direction of traffic flow through the selected corridor; and controlling, by the one or more processors, the vehicle in the autonomous driving mode to enter and follow the selected one of the one or more corridors.

In one example, the method also includes determining the direction of traffic flow through the selected corridor by analyzing how opposing traffic relative to the vehicle would enter and pass through the one or more corridors. In another example, the method also includes determining the direction of traffic flow through the selected corridor by analyzing signs proximate to any of the one or more corridors. In another example, the method also includes determining the direction of traffic flow through the selected corridor by observing traffic through any of the one or more corridors. In another example, the method also includes receiving information from one or more computing devices of a second vehicle identifying the one or more corridors and determining the direction of traffic flow through the selected corridor based on the received information. In another example, the method also includes after using the received data to identify the one or more corridors, sending a request to a computing device remote from the vehicle for instructions as to how to proceed, and receiving the instructions, and wherein selecting the selected one of the one or more corridors is further based on the received instructions. In another example, the method also includes determining a direction of traffic flow through each of the one or more corridors, and wherein selecting the selected corridor is further based on any determined directions of traffic flow. In another example, the one or more corridors are not defined by two or more lane lines.

Another aspect of the disclosure provides a system for controlling a vehicle in an autonomous driving mode. The system includes one or more processors configured to maneuver a vehicle in the autonomous driving mode using pre-stored map information identifying traffic flow directions; receive data from a perception system of the vehicle identifying objects in an external environment of the vehicle related to a traffic redirection not identified the map information; use the received data to identify one or more corridors of a traffic redirection; select one of the one or more corridors based on a direction of traffic flow through the selected corridor; and control the vehicle in the autonomous driving mode to enter and follow the selected one of the one or more corridors.

In one example, the one or more processors are further configured to determine the direction of traffic flow through the selected corridor by analyzing how opposing traffic relative to the vehicle would enter and pass through the one or more corridors. In another example, the one or more processors are further configured to determine the direction of traffic flow through the selected corridor by analyzing signs proximate to any of the one or more corridors. In another example, the one or more processors are further configured to determine the direction of traffic flow through the selected corridor by observing traffic through any of the one or more corridors. In another example, the one or more processors are further configured to receive information from one or more computing devices of a second vehicle identifying the one or more corridors, and determine the direction of traffic flow through the selected corridor based on the received information. In another example, the one or more processors are further configured to, after using the received data to identify the one or more corridors, send a request to a computing device remote from the vehicle for instructions as to how to proceed, and receive the instructions, and wherein selecting the selected one of the one or more corridors is further based on the received instructions. In another example, the one or more processors are further configured to determine a direction of traffic flow through each of the one or more corridors, and wherein selecting the selected corridor is further based on any determined directions of traffic flow. In another example, the one or more corridors are not defined by two or more lane lines. In another example, the system also includes the vehicle.

A further aspect of the disclosure provides a non-transitory computer readable medium on which instructions are stored. The instructions, when executed by one or more processors, cause the one or more processors to perform a method of controlling a vehicle in an autonomous driving mode. The method includes maneuvering a vehicle in the autonomous driving mode using pre-stored map information identifying traffic flow directions; receiving data from a perception system of the vehicle identifying objects in an external environment of the vehicle related to a traffic redirection not identified the map information; using the received data to identify one or more corridors of a traffic redirection; selecting one of the one or more corridors based on a direction of traffic flow through the selected corridor; and controlling the vehicle in the autonomous driving mode to enter and follow the selected one of the one or more corridors.

In one example, the method also includes determining the direction of traffic flow through the selected corridor by analyzing how opposing traffic relative to the vehicle would enter and pass through the one or more corridors. In another example, the method also includes determining the direction of traffic flow through the selected corridor by analyzing signs proximate to any of the one or more corridors. In another example, the method also includes determining the direction of traffic flow through the selected corridor by observing traffic through any of the one or more corridors. In another example, the method also includes receiving information from one or more computing devices of a second vehicle identifying the one or more corridors and determining the direction of traffic flow through the selected corridor based on the received information. In another example, the method also includes after using the received data to identify the one or more corridors, sending a request to a computing device remote from the vehicle for instructions as to how to proceed, and receiving the instructions, and wherein selecting the selected one of the one or more corridors is further based on the received instructions. In another example, the method also includes determining a direction of traffic flow through each of the one or more corridors, and wherein selecting the selected corridor is further based on any determined directions of traffic flow. In another example, the one or more corridors are not defined by two or more lane lines.

DETAILED DESCRIPTION

Overview

Figure 1:
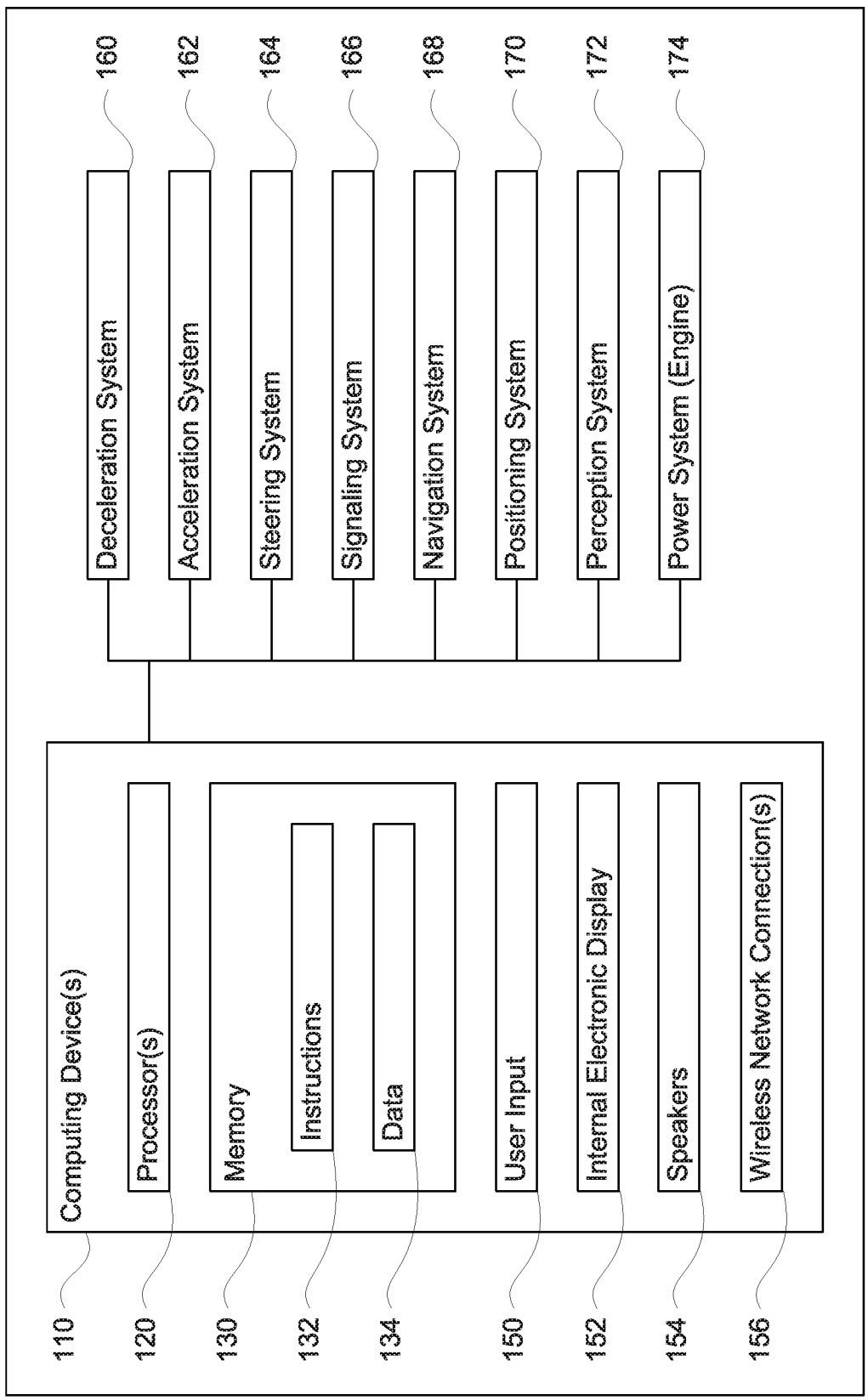
FIG. 1 is a functional diagram of an example vehicle in accordance with aspects of the disclosure.

In many cases, traffic flow redirections are well defined. However, in some cases the redirection may involve newly created corridors that do not clearly or completely separate opposing traffic. That is, it may be possible for traffic from either opposing direction of traffic to enter one or more of the corridors. In such ambiguous cases, it is essential for an autonomous vehicle's computing devices to choose the correct corridor. If not, the vehicle could either become stuck or enter a corridor driving the wrong direction which poses additional safety concerns.

In addition, these corridors may be readily understandable to a human driver, but ambiguous to a vehicle's computing system, but. This may be due to the presence of important signals that a vehicle's computing devices are not able to detect or identify, such as non-standard signage that the vehicle can't detect (e.g. a handwritten arrow or keep right/left sign), or a cue that is outside of the vehicle's sensing range but within a human's. In other cases, the vehicle's computing devices may all the signals the computing devices need, but must perform the proper analysis to determine how to proceed. To fully understand what's going on, it is necessary for the computing devices to first detect there may be an ambiguity, and then look for signals that could resolve it.

In order to determine which corridor a vehicle should enter, the vehicle's computing devices must first identify that an ambiguity exists. This may be achieved by processing data from the vehicle's perception system in order to identify one or more corridors. In some instances, if the computing devices identify more than one possible corridor, this may create an ambiguity as to which of the corridors the vehicle should enter (left, right, middle, etc.).

The computing devices may then attempt to resolve the ambiguity by using one or more approaches to analyze corridors and determine the appropriate flow of traffic (same as the vehicle or opposing) through each corridor. In one example approach, the computing devices may analyze the corridors in reverse. As another approach, the computing devices may attempt to resolve the ambiguity by analyzing any signs. As yet a further approach, the computing devices may attempt to determine the direction of traffic through each corridor by observing the behavior of other vehicles. As another approach, the computing devices may use information provided by other vehicles which have recently passed through the areas.

If the ambiguity cannot be resolved using one or more of the above actions, the computing devices may send a request to a human operator to provide instructions as to how to proceed. This may include sending information identifying the corridors the computing devices identified for review and receiving instructions as to how to proceed. In some instances, the human operator may simply reroute the vehicle, or the computing devices may control the vehicle in order to avoid the corridors completely by turning the vehicle around and/or re-routing the vehicle.

The features described herein may allow a vehicle operating in an autonomous driving mode to identify ambiguities caused by traffic redirections including one or more corridors, "reason" about the situation and identify how traffic should flow through the corridors, and respond appropriately. In vehicles with manual driving modes, this may reduce the incidence of disengages of the autonomous driving mode.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. As an example, data 134 of memory 130 may store predefined scenarios. A given scenario may identify a set of scenario requirements including a type of object, a range of locations of the object relative to the vehicle, as well as other factors such as whether the autonomous vehicle is able to maneuver around the object, whether the object is using a turn signal, the condition of a traffic light relevant to the current location of the object, whether the object is approaching a stop sign, etc. The requirements may include discrete values, such as "right turn signal is on" or "in a right turn only lane", or ranges of values such as "having an heading that is oriented at an angle that is 30 to 60 degrees offset from a current path of vehicle 100." In some examples, the predetermined scenarios may include similar information for multiple objects.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. As an example, internal electronic display 152 may be controlled by a dedicated computing device having its own processor or central processing unit (CPU), memory, etc. which may interface with the computing device 110 via a high-bandwidth or other network connection. In some examples, this computing device may be a user interface computing device which can communicate with a user's client device. Similarly, the memory may be a hard drive or other storage media located in a housing different from that of computing device 110. Accordingly, references to a processor or computing device will be understood to include references to a collection of processors or computing devices or memories that may or may not operate in parallel.

Computing device 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100. In addition to internal speakers, the one or more speakers 154 may include external speakers that are arranged at various locations on the vehicle in order to provide audible notifications to objects external to the vehicle 100.

In one example, computing device 110 may be an autonomous driving computing system incorporated into vehicle 100. The autonomous driving computing system may capable of communicating with various components of the vehicle. For example, returning to FIG. 1, computing device 110 may be in communication with various systems of vehicle 100, such as deceleration system 160 (for controlling braking of the vehicle), acceleration system 162 (for controlling acceleration of the vehicle), steering system 164 (for controlling the orientation of the wheels and direction of the vehicle), signaling system 166 (for controlling turn signals), navigation system 168 (for navigating the vehicle to a location or around objects), positioning system 170 (for determining the position of the vehicle), perception system 172 (for detecting objects in an external environment of the vehicle), and power system 174 (for example, a battery and/or gas or diesel powered engine) in order to control the movement, speed, etc. of vehicle 100 in accordance with the instructions 132 of memory 130 in an autonomous driving mode which does not require or need continuous or periodic input from a passenger of the vehicle. Again, although these systems are shown as external to computing device 110, in actuality, these systems may also be incorporated into computing device 110, again as an autonomous driving computing system for controlling vehicle 100.

The computing device 110 may control the direction and speed of the vehicle by controlling various components. By way of example, computing device 110 may navigate the vehicle to a destination location completely autonomously using data from the map information and navigation system 168. Computing devices 110 may use the positioning system 170 to determine the vehicle's location and perception system 172 to detect and respond to objects when needed to reach the location safely. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

As an example, computing device 110 may interact with deceleration system 160 and acceleration system 162 in order to control the speed of the vehicle. Similarly, steering system 164 may be used by computing device 110 in order to control the direction of vehicle 100. For example, if vehicle 100 configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 134 may store map information, e.g., highly detailed maps that computing devices 110 can use to navigate or control the vehicle. As an example, these maps may identify the shape and elevation of roadways, lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and right lane lines or other lane markers that define the boundary of the lane. Thus, most lanes may be bounded by a left edge of one lane line and a right edge of another lane line.

The perception system 172 also includes one or more components for detecting objects external to the vehicle such as other vehicles, obstacles in the roadway, traffic signals, signs, trees, etc. For example, the perception system 172 may include one or more LIDAR sensors, sonar devices, radar units, cameras and/or any other detection devices that record data which may be processed by computing devices 110. The sensors of the perception system may detect objects and their characteristics such as location, orientation, size, shape, type (for instance, vehicle, pedestrian, bicyclist, etc.), heading, and speed of movement, etc. The raw data from the sensors and/or the aforementioned characteristics can be quantified or arranged into a descriptive function, vector, and or bounding box and sent for further processing to the computing devices 110 periodically and continuously as it is generated by the perception system 172. As discussed in further detail below, computing devices 110 may use the positioning system 170 to determine the vehicle's location and perception system 172 to detect and respond to objects when needed to reach the location safely.

Figure 2:
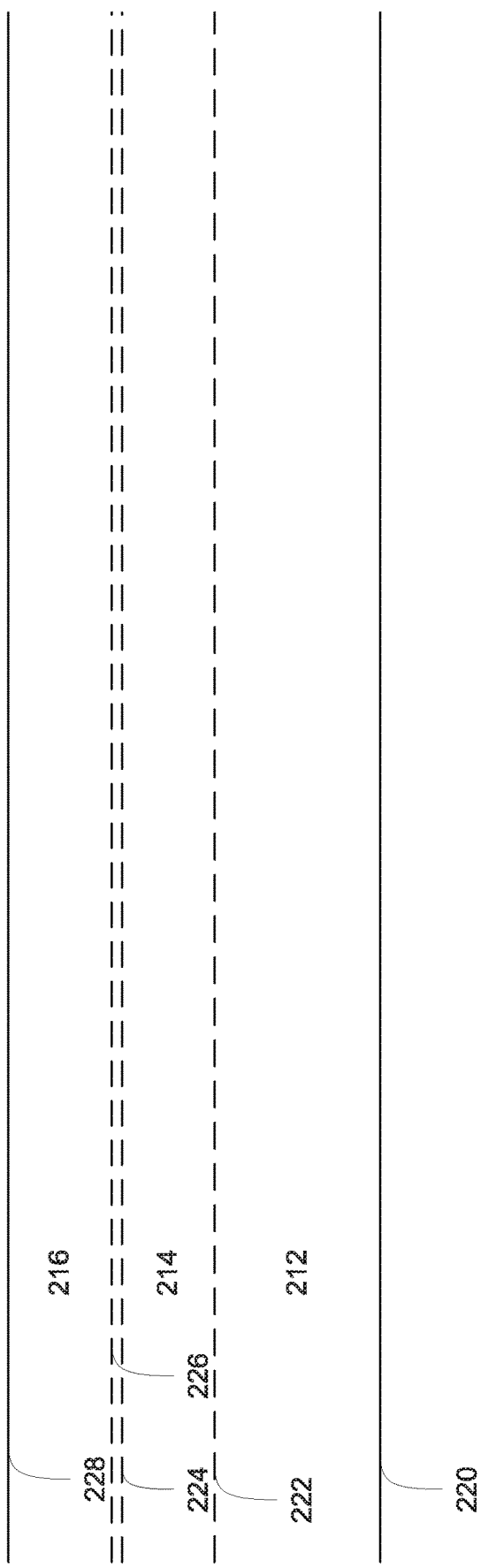
FIG. 2 is an example representation of detailed map information in accordance with aspects of the disclosure.
Figure 3A:
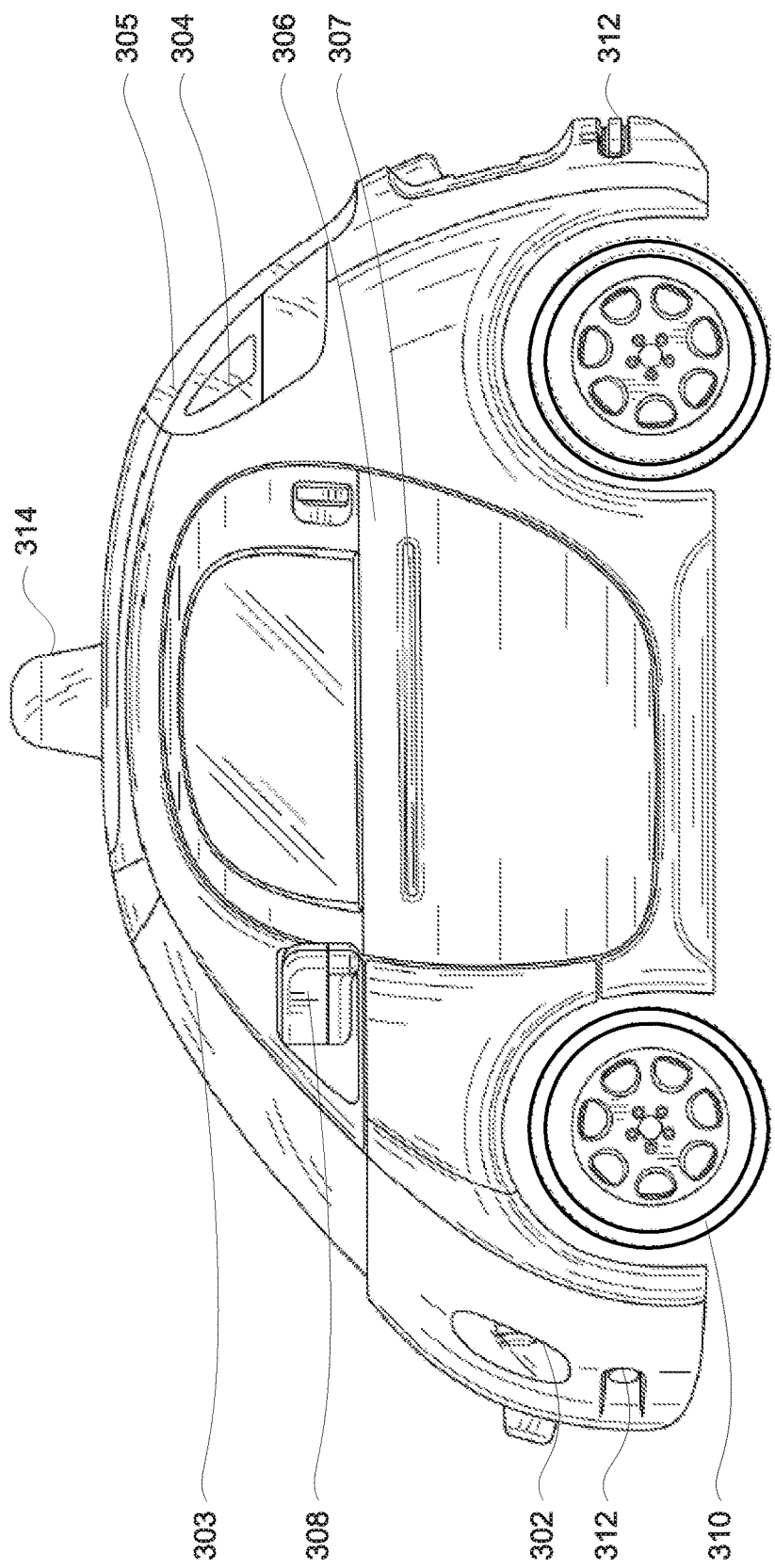
FIGS. 3A-3D are example external views of a vehicle in accordance with aspects of the disclosure.
Figure 3C:
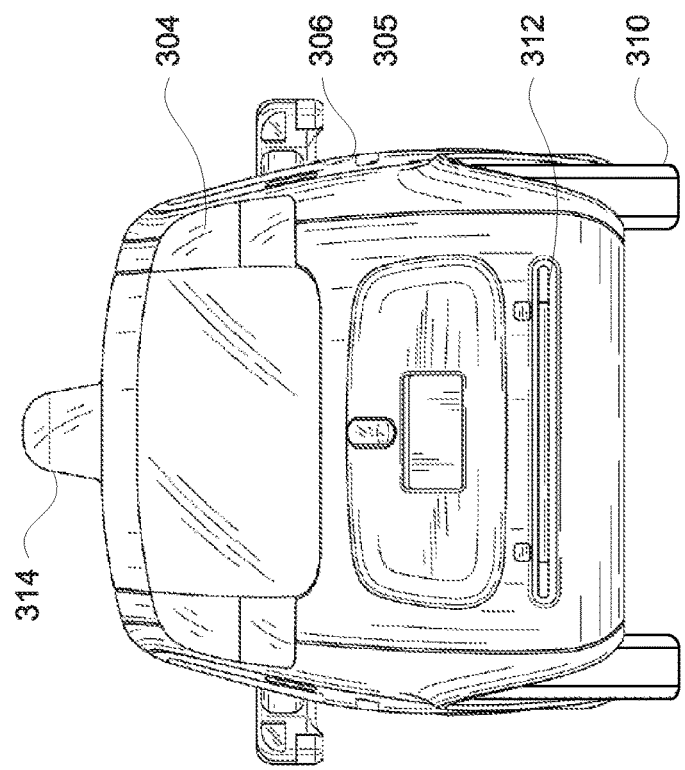
Figure 3B:
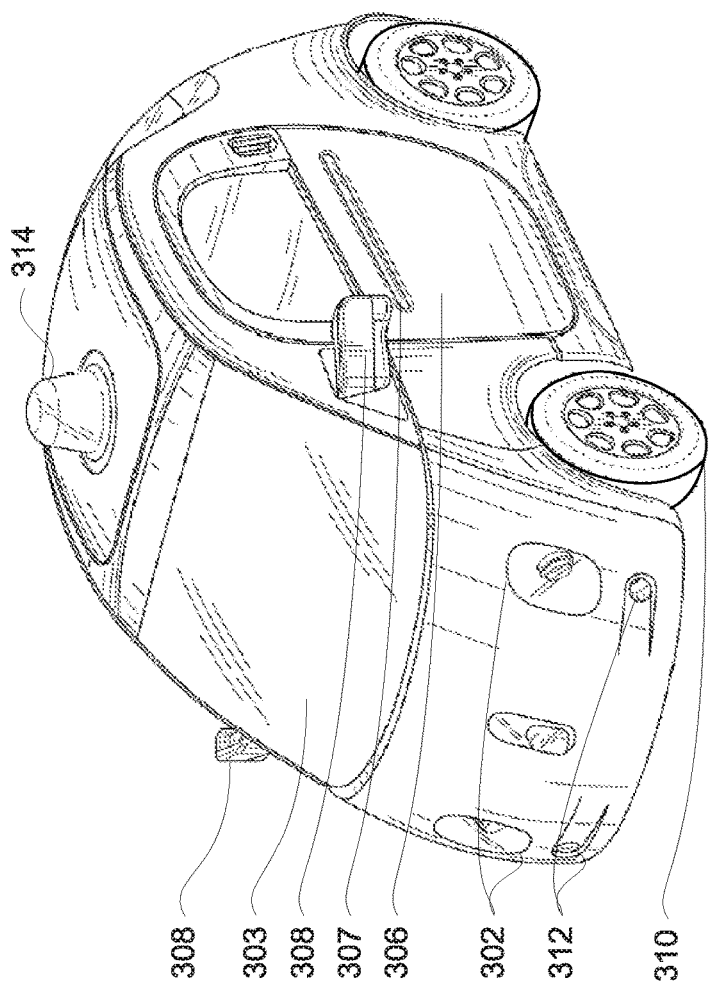
Figure 3D:
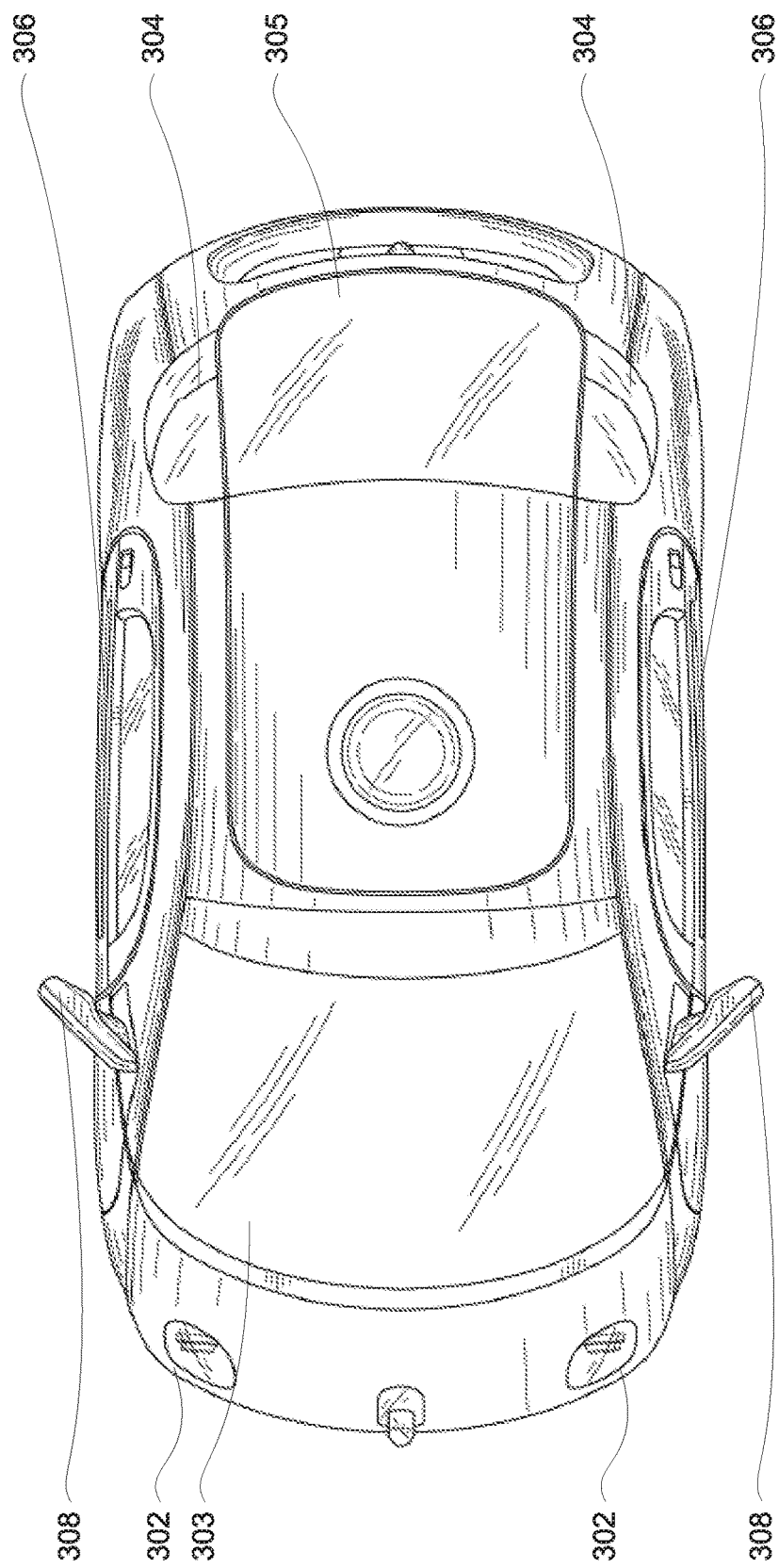

FIG. 2 is an example of map information 200 for a section of roadway. The map information 200 includes information identifying the shape, location, and other characteristics of various road features. In this example, the map information includes three lanes 212, 214, 216 bounded by curb 220, lane lines 222, 224, 226, and curb 228. Lanes 212 and 214 have the same direction of traffic flow (in an eastward direction), while lane 216 has a different traffic flow (in a westward direction). In addition, lane 212 is significantly wider than lane 214, for instance to allow for vehicles to park adjacent to curb 220. Although the example of map information includes only a few road features, for instance, curbs, lane lines, and lanes, given the nature of the roadway, the map information 200 may also identify various other road features such as traffic signal lights, crosswalks, sidewalks, stop signs, yield signs, speed limit signs, road signs, etc. Although not shown, the detailed map information may also include information identifying speed limits and other legal traffic requirements as well as historical information identifying typical and historical traffic conditions at various dates and times.

Although the detailed map information is depicted herein as an image-based map, the map information need not be entirely image based (for example, raster). For example, the detailed map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

FIGS. 3A-3D are examples of external views of vehicle 100. As can be seen, vehicle 100 includes many features of a typical vehicle such as headlights 302, windshield 303, taillights/turn signal lights 304, rear windshield 305, doors 306, side view mirrors 308, tires and wheels 310, and turn signal/parking lights 312. Headlights 302, taillights/turn signal lights 304, and turn signal/parking lights 312 may be associated the signaling system 166. Light bar 307 may also be associated with the signaling system 166. Housing 314 may house one or more sensors, such as LIDAR sensors, sonar devices, radar units, cameras, etc. of the perception system 172, though such sensors may also be incorporated into other areas of the vehicle as well.

Figure 4:
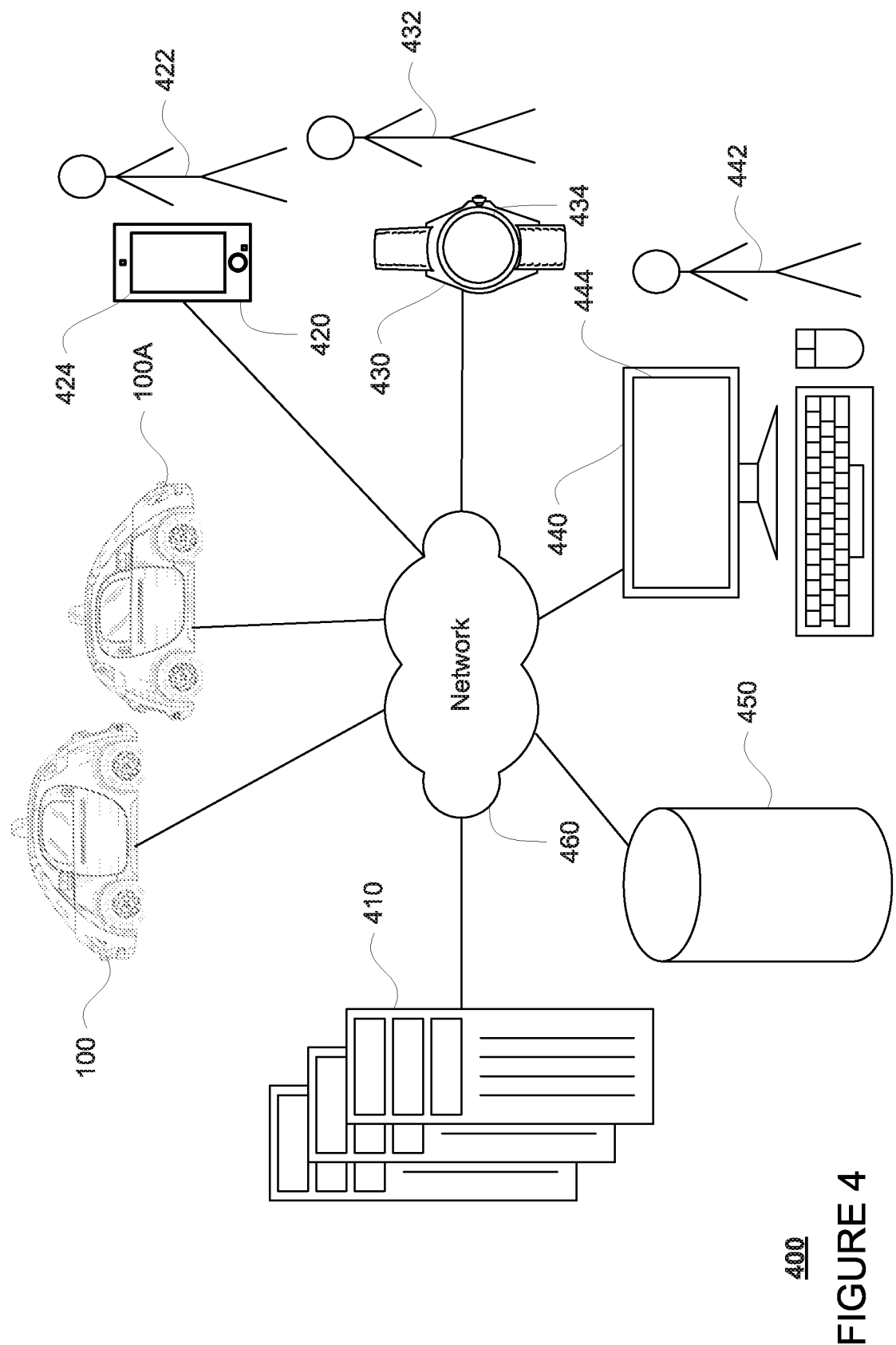
FIG. 4 is an example pictorial diagram of a system in accordance with aspects of the disclosure.
Figure 5:
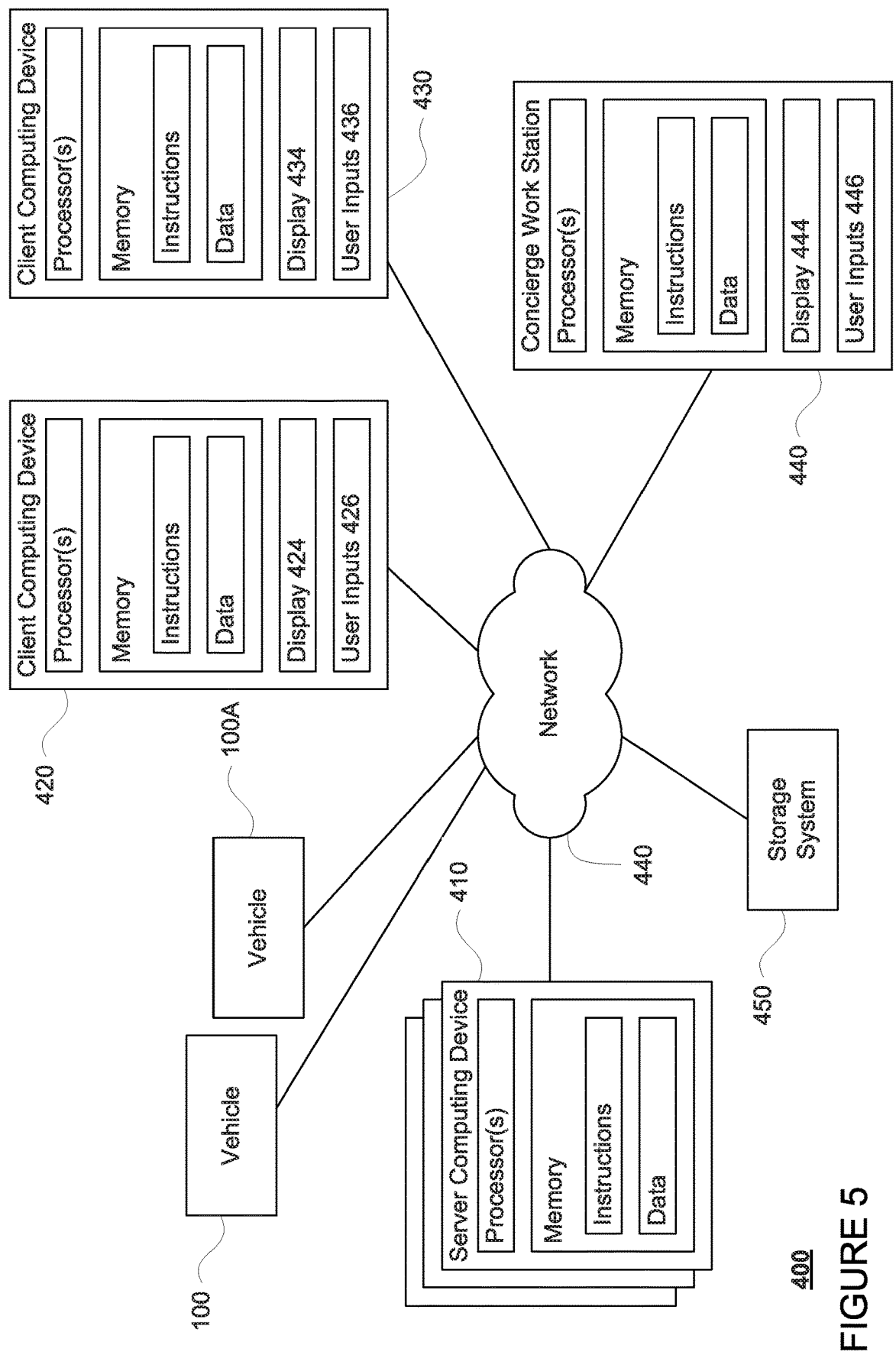
FIG. 5 is an example functional diagram of a system in accordance with aspects of the disclosure.

The one or more computing devices 110 of vehicle 100 may also receive or transfer information to and from other computing devices, for instance using wireless network connections 156. The wireless network connections may include, for instance, BLUETOOTH®, Bluetooth LE, LTE, cellular, near field communications, etc. and various combinations of the foregoing. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicle 100A which may be configured similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 134, and instructions 132 of computing device 110.

The network 460, and intervening nodes, may include various configurations and protocols including short range communication protocols such as BLUETOOTH®, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 110 may include a server having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with one or more computing devices 110 of vehicle 100 or a similar computing device of vehicle 100A as well as client computing devices 420, 430, 440 via the network 460. For example, vehicles 100 and 100A may be a part of a fleet of vehicles that can be dispatched by server computing devices to various locations. In this regard, the vehicles of the fleet may periodically send the server computing devices location information provided by the vehicle's respective positioning systems and the one or more server computing devices may track the locations of the vehicles.

In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 5, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wrist watch in FIG. 4. As an example the user may input information using a small keyboard, a keypad, microphone, using visual signals with a camera, or a touch screen.

In some examples, client computing device 440 may be concierge work station used by an administrator to provide concierge services to users such as users 422 and 432. For example, a remote operator or concierge 442 may use the concierge work station 440 to communicate via a telephone call or audio connection with users through their respective client computing devices or vehicles 100 or 100A in order to ensure the safe operation of vehicles 100 and 100A and the safety of the users as described in further detail below.

Although only a single concierge work station 440 is shown in FIGS. 4 and 5, any number of such work stations may be included in a typical system.

Storage system 450 may store various types of information as described in more detail below. This information may be retrieved or otherwise accessed by a server computing device, such as one or more server computing devices 410, in order to perform some or all of the features described herein. For example, the information may include user account information such as credentials (e.g., a user name and password as in the case of a traditional single-factor authentication as well as other types of credentials typically used in multi-factor authentications such as random identifiers, biometrics, etc.) that can be used to identify a user to the one or more server computing devices. The user account information may also include personal information such as the user's name, contact information, identifying information of the user's client computing device (or devices if multiple devices are used with the same user account), as well as one or more unique signals for the user.

The storage system 450 may also store routing data for generating and evaluating routes between locations. For example, the routing information may be used to estimate how long it would take a vehicle at a first location to reach a second location. In this regard, the routing information may include map information, not necessarily as particular as the detailed map information described above, but including roads, as well as information about those road such as direction (one way, two way, etc.), orientation (North, South, etc.), speed limits, as well as traffic information identifying expected traffic conditions, etc.

The storage system 450 may also store information which can be provided to client computing devices for display to a user. For instance, the storage system 450 may store predetermined distance information for determining an area at which a vehicle is likely to stop for a given pickup or destination location. The storage system 450 may also store graphics, icons, and other items which may be displayed to a user as discussed below.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIG. 4 and/or may be directly connected to or incorporated into any of the computing devices 110, 410, 420, 430, 440, etc.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 6:
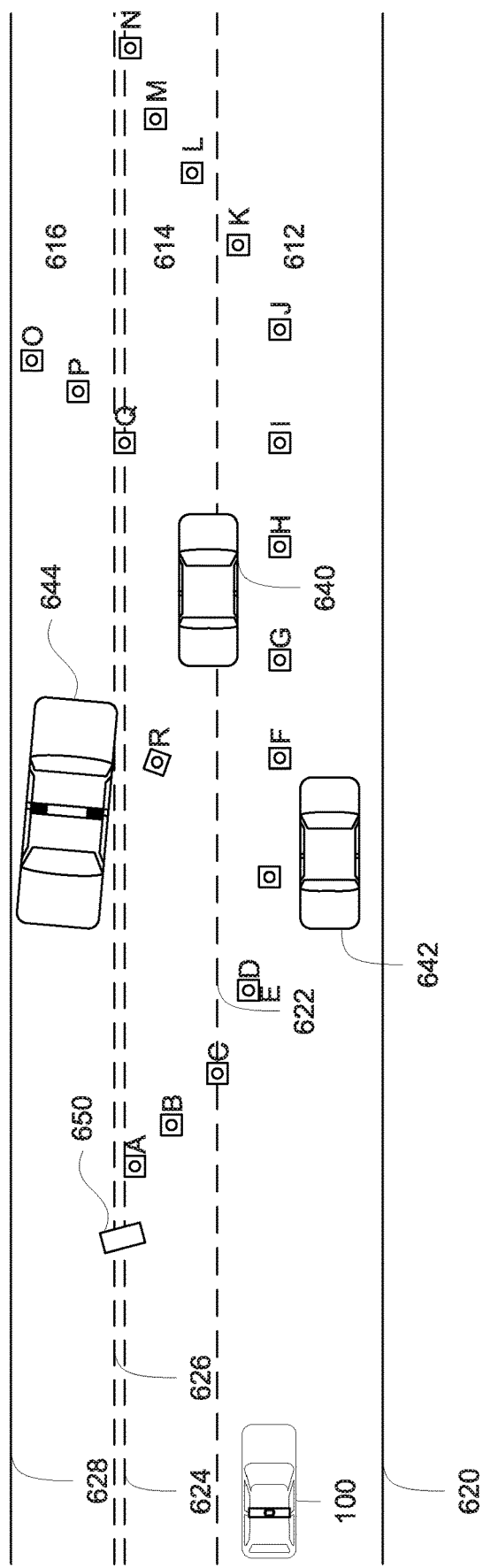
FIG. 6 is a view of a section of roadway in accordance with aspects of the disclosure.

FIG. 6 is an example view of vehicle 100 driving along a roadway 610 corresponding to roadway 210 of FIG. 2. In that regard, lanes 612, 614, 616 correspond to the shape and location of lanes 212, 214, 216, curbs 620, 628 correspond to the shape and location of curb 220, and lane lines 622, 624, 626 correspond to the shape and location of lane lines 222, 224, 226, and curb 228. In this example, vehicle 100 is traveling in lane 612.

Figure 7:
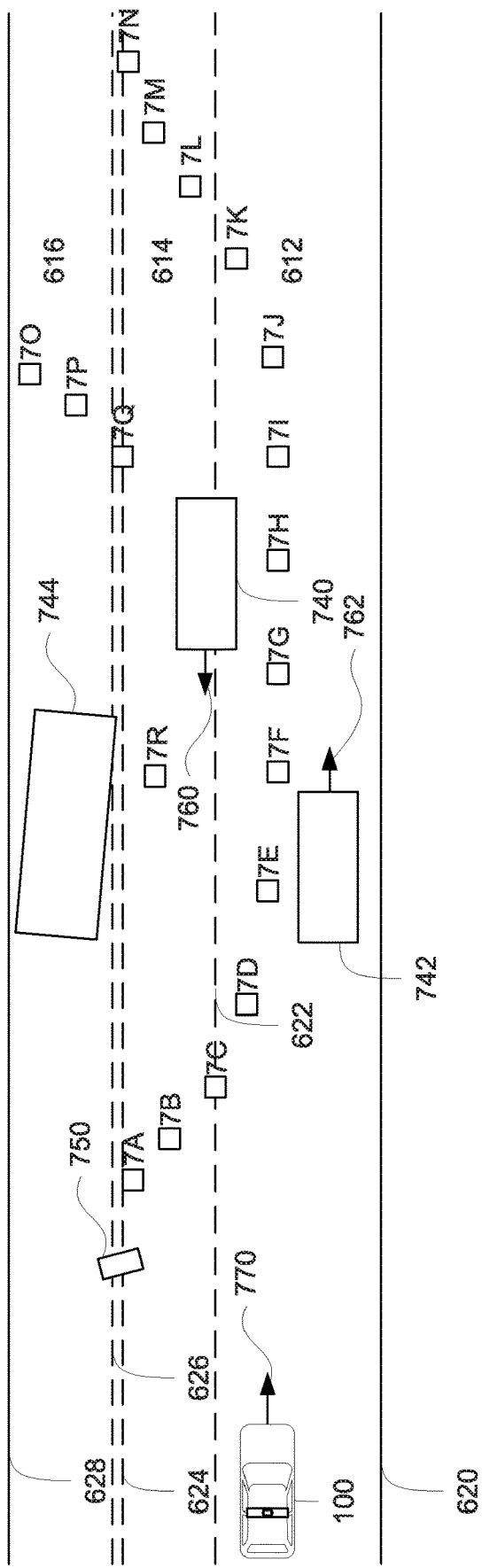
FIG. 7 is an example of sensor data for the section of roadway and other information in accordance with aspects of the disclosure.

As the vehicle moves along lane 612, the perception system 172 provides the computing devices with sensor data regarding the shapes and location of objects, such as curbs 620, 628, lane lines 622, 624, 624, a sign 650, as well as traffic cones A-R. FIG. 7 depicts sensor data perceived by the various sensors of the perception system 172 when vehicle 100 is in the situation as depicted in FIG. 6 in combination with other information available to the computing devices 110. In this example, vehicles 640, 642, 644 are represented by bounding boxes 740, 742, 744 as provided by the perception system 172 to the computing devices 110, traffic cones A-R are represented by bounding boxes 7A-7R, and sign 650 is represented by bounding box 750. Of course, these bounding boxes represent merely a volume of space within which data points corresponding to an object are at least approximately bounded within. In addition, the actual heading of vehicle 100 and estimated heading of bounding boxes 740 and 742 are represented by arrows 770, 760, and 762, respectively. As bounding boxes 744 appears to be moving very slowly or not at all, the computing devices 110 may determine that the object represented by this bounding box is stationary adjacent curb 628.

In order to determine which corridor a vehicle should enter, the vehicle's computing devices must first identify that an ambiguity exists. This may be achieved by processing data from the vehicle's perception system in order to identify one or more corridors. Each of these one or more corridors is such that it corresponds to a path along a roadway, where the path is not already identified in the map information of the vehicle. In other words, the path would generally not correspond to a lane of traffic defined in the map information and the characteristics of that lane. For instance, the characteristics or rules of a traffic lane may change, such as where a center turn lane may is configured with traffic cones to provide for both turning and proceeding through an intersection, where an eastbound lane of traffic may become a westbound lane of traffic, or the path does not correspond to lane or traffic or an area between two lane lines (or other lane markers) in the map information.

Figure 8:
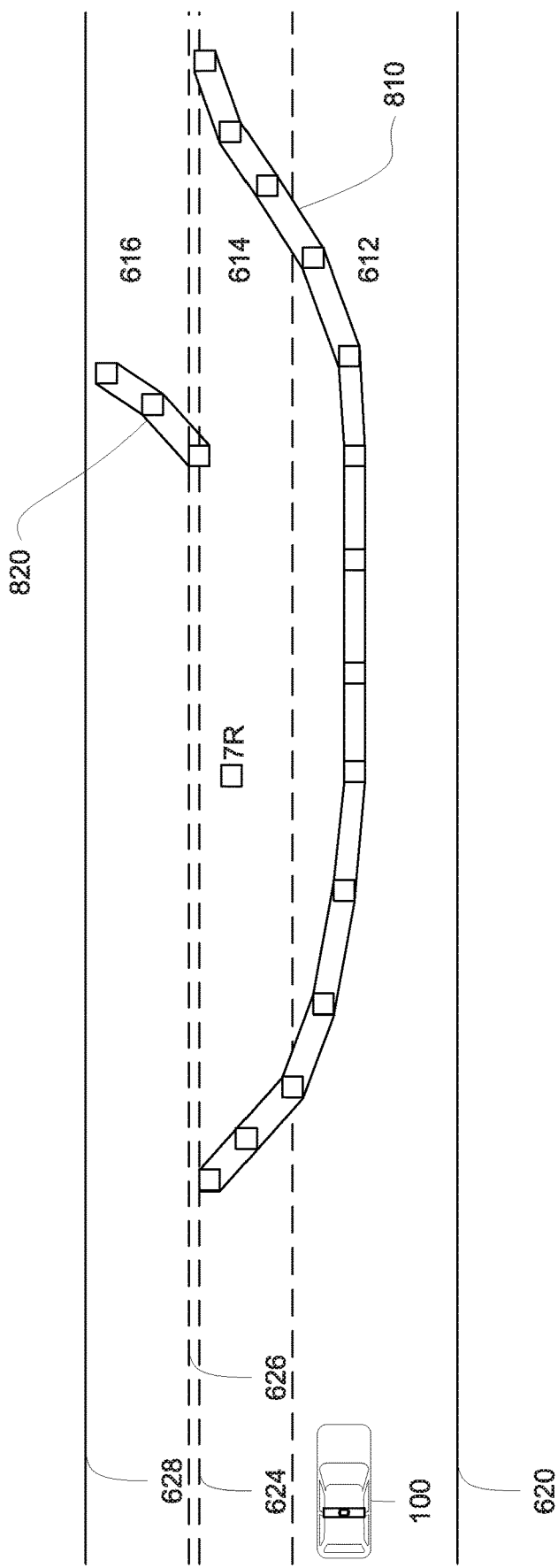
FIG. 8 is another example of sensor data for the section of roadway and other information in accordance with aspects of the disclosure.

For instance, certain types of objects, other than lane lines, such as cones or barrels, may be clustered together in order to determine "boundaries" of a corridor. As an example, if the vehicle is unable to pass between two cones, these objects may be clustered together and assumed to be part of a corridor. As shown in the image of FIG. 7, computing devices 110 may group together cones A-N (or bounding boxes 7A-7N) based on their proximity to one another because vehicle 100 could not fit between the cones or the cones are positioned in a way as to form a barrier. In addition, computing devices 110 may group together cones O-Q (or bounding boxes 7O-7Q) based on their proximity to one another because vehicle 100 could not fit between the cones. FIG. 8 depicts cluster 810 corresponding to cones A-N as well as cluster 820 corresponding to cones 0-Q. Cone 7 (or bounding box 7R) is not included in either cluster 810 or 820. For clarity and ease of understanding, FIG. 8 does not include the bounding boxes 740, 742, 744 or 740.

Once these objects have been clustered together, the computing devices 110 may use the clusters as well as other unclustered objects to identify one or more possible corridors for the vehicle to follow in order to avoid the clustered objects. In this regard, turning to FIG. 9, the computing devices may identify two corridors, corridor 910 and corridor 920 as possible options for vehicle 110 to follow given the location of clusters 810 and 820 as well as cone 7 (or bounding box 7R). Again, for clarity and ease of understanding, FIG. 9 does not include the bounding boxes 740, 742, 744 or 740.

In addition or alternatively, the physical geometry of the location of these objects may create an ambiguity. For example for cone A (or bounding box 7A) the vehicle may either pass to the left to enter corridor 920 or to the right to enter corridor 910. In addition, when in corridor 920, a vehicle may pass either two the right or left of cone R (or bounding box 7R) which again provides the possibility of two sub-corridors 920A, 920B of corridor 920. Thus, there is more than one possibility for proceeding. This creates create an ambiguity as to which of the corridors the vehicle should enter. In other words, if there are more than two corridors, there may be more than one choice for the vehicle. In another similar example, in the case of two cones delineating three separate corridors, the vehicle may proceed to the right of two cones (or other objects), between two cones (or other objects), or to the left of the two cones (or other objects). Thus, in such an example, there are three possible corridors, which can create a more complex ambiguity.

The computing devices may then attempt to resolve the ambiguity by using one or more approaches to analyze corridors and determine the appropriate flow of traffic through each corridor. Simply put, the computing devices 110 may determine whether the traffic flow for each corridor continues in the direction that the vehicle is currently traveling or is actually opposing the direction that the vehicle is currently traveling, and in that regard, the corridor is configured to allow for opposing traffic. Again, referencing FIG. 9, it may be simple for a human to determine which the appropriate corridor to travel is, but this is not always clear for computing devices of a vehicle such as vehicle 100.

Figure 9:
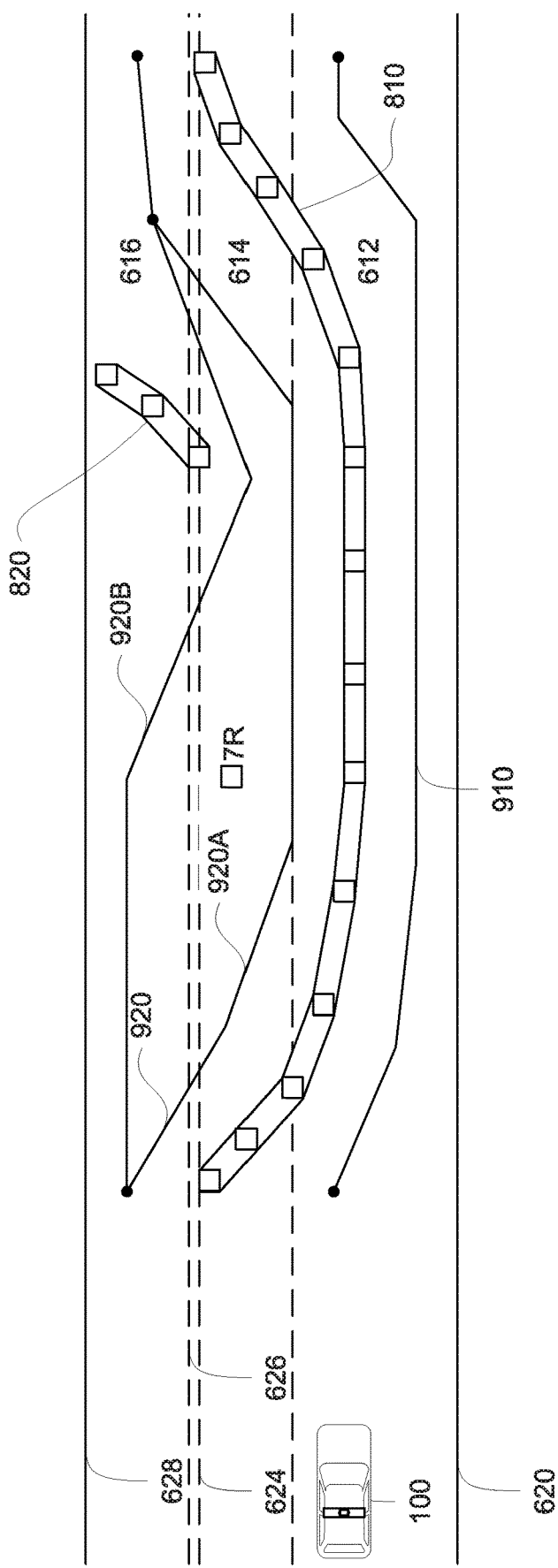
FIG. 9 is another example of sensor data for the section of roadway and other information in accordance with aspects of the disclosure.

In one example analysis, the computing devices may analyze the corridors in reverse. For instance, if the situation would not be ambiguous for opposing traffic the computing devices may determine that such corridors are for opposing traffic. In other words, if it would be readily apparent which corridor or corridors opposing traffic should utilize, then that corridor or corridors may be eliminated as a possibility for the vehicle. Again, as shown in FIG. 9, it may be simpler to determine that a vehicle traveling in an opposing traffic lane, here lane 616, may proceed along the roadway 610 by following corridor 920 based on the relative position of cone 7 (or bounding box 7N). For instance, because that other vehicle will travel passed cone 7 (or bounding box 7N) while staying within lane 616, that other vehicle will already be following corridor 920. In that regard, the computing devices 110 may determine that corridor 920, including sub-corridors 920A and 920B, is configured for opposing traffic.

By process of elimination, the computing devices 110 may determine that any remaining corridor would be appropriate for the vehicle 110 to pass through. In this regard, one of the corridors may be selected based on the determined flows of traffic through the corridors. For instance, because there are only two identified corridors, and corridor 920 is determined to be configured for opposing traffic, the computing devices 110 may then determine that the vehicle should proceed down corridor 910. At this point, the vehicle may be controlled in order to enter and follow the selected corridor. Of course, if there is more than one possible corridor remaining after using this technique, as noted above, additional approaches may also be utilized.

In that regard, in addition or alternatively, the computing devices may attempt to resolve the ambiguity by analyzing any signs. As an example, in the area of a redirection, there may be signs that indicate which corridors should or should not be used from certain directions. Such signs may include keep left or right arrows, wrong way signs, etc. In some cases, these signs may be held by construction workers who are directing traffic in both directions through the same corridor. These signs may be detected using various image recognition and optical character recognition techniques. Again, these signs may indicate which if any of the corridors are appropriate for the vehicle to pass through. For instance, computing devices 110 may use optical character recognition techniques to identify text of sign 650 in an image captured by a camera of the vehicle's perception system 172. The sign may indicate that the vehicle should "keep right" or "do not enter." This may indicate that it is more likely that vehicle 100 should follow corridor 910 than 920.

In addition to the context of the sign, the location and orientation of the sign may provide the computing devices 110 with cues about the "meaning" of the sign. For instance, whether the sign is in a place where it is clearly associated with one corridor or another, whether the sign is giving a command (such as a keep right or keet-keep left arrow) relative to one corridor or another, whether the content of the sign is visible from one direction of traffic or another as this may indicate which direction of traffic the sign is expected to affect, etc. For instance, given the location of sign 650 relative to corridors 910 and 920, and the sign's orientation towards eastbound traffic, the computing devices 110 may determine that it is more likely that vehicle 100 should follow corridor 910 than 920.

Thus, using signage may also provide the computing devices 110 with information about the direction of traffic flow through one or more of the corridors, thereby indicating which of the corridors the computing devices 110 should select to enter and follow as discussed above. However, there may not always be sufficient signage to identify which corridor the vehicle may enter.

Figure 10:
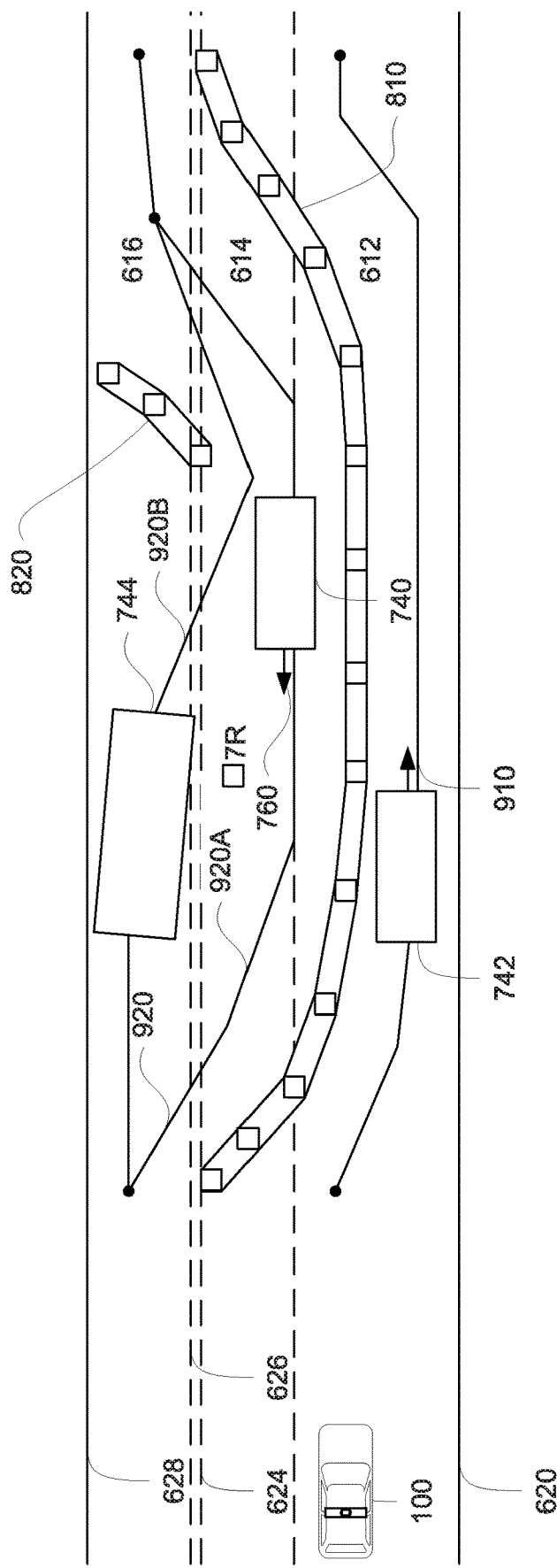
FIG. 10 is a further example of sensor data for the section of roadway and other information in accordance with aspects of the disclosure.

As yet a further approach, the computing devices may attempt to determine the direction of traffic through each corridor by observing the behavior of other vehicles. For instance, if vehicles from either direction (same as the vehicle or opposing) are observed to traverse certain corridors in certain directions the computing devices may use this information to determine which if any of the corridors are appropriate for the vehicle to enter. Turning to FIG. 10, given the location and heading (arrow 760) of vehicle 640 (or bounding box 740), that vehicle appears to be most likely following corridor 920 and here, sub-corridor 920A. As vehicle 640 is actually approaching vehicle 100 (as opposing traffic), the computing devices 110 may determine that for this reason along or that for this additional reason, corridor 920 and sub-corridor 920A are corridors configured for opposing traffic. Similarly, given the location of vehicle 640 (or bounding box 740) and lack of movement, that vehicle appears to be most likely blocking sub-corridor 920B, the computing devices 110 may determine that corridor 920B may not be an appropriate corridor for vehicle 100 or opposing traffic. Thus, using behavior of other vehicles may also provide the computing devices 110 with information about the direction of traffic flow through one or more of the corridors, thereby indicating which of the corridors the computing devices 110 should select to enter and follow as discussed above.

As another approached to be used in addition or as an alternative to any of the above, the computing devices may detect road surface conditions and use this to determine whether the vehicle should avoid a certain corridor. For instance, using sensor data provided by the perception system 172, the computing devices may determine whether a corridor includes an open trench or drop off of a certain height, such as more than a few inches, or whether a corridor includes an unpaved road surface. In such instances, the computing devices may determine that a vehicle should not use that corridor.

As another approach to be used in addition or as an alternative to any of the above, the computing devices may use information provided by other vehicles which have recently passed through the areas. For instance if a vehicle passes through the area operating in an autonomous driving mode (or in a manual driving mode where the autonomous software was running in the background but not controlling the vehicle), this vehicle's computing devices may share information about the ambiguity and how the computing devices responded with other vehicles in the area. In addition or alternatively, if a vehicle's computing devices identify such corridors and a possible ambiguity, the computing devices may send this information as well as any sensor information such as camera images or Lidar data. This may be especially useful to vehicles which may approach the ambiguity from a different direction or vantage point. For instance, if one vehicle passes through an intersection with no redirection, but detected a keep left, keep right, wrong way, etc. sign down one of the cross streets of the intersection, this information would be for any vehicle that later drives down that cross street.

If the ambiguity cannot be resolved using one or more of the above approaches or actions, the computing devices may send a request to a human operator to provide instructions as to how to proceed. For instance, the computing devices 110 may use network 460 to request assistance from concierge 442 via concierge work station 440. This may include sending information identifying the corridors the computing devices identified for review and receiving instructions as to how to proceed (i.e. which corridor or corridors are appropriate for the vehicle to enter. In some instances, the concierge 442 may simply reroute the vehicle, for instance, if the ambiguity is such that a human operator is also uncertain. If the concierge 442 is not available or cannot confidently determine the correct answer, for instance, where the relevant signage was much further back, has been knocked over, is unclear, etc., the computing devices 110 may determine that continuing through any of the corridors is unacceptable. As a result, the computing devices 110 may control the vehicle in order to avoid the corridors completely by turning the vehicle around and/or re-routing the vehicle.

Figure 11:
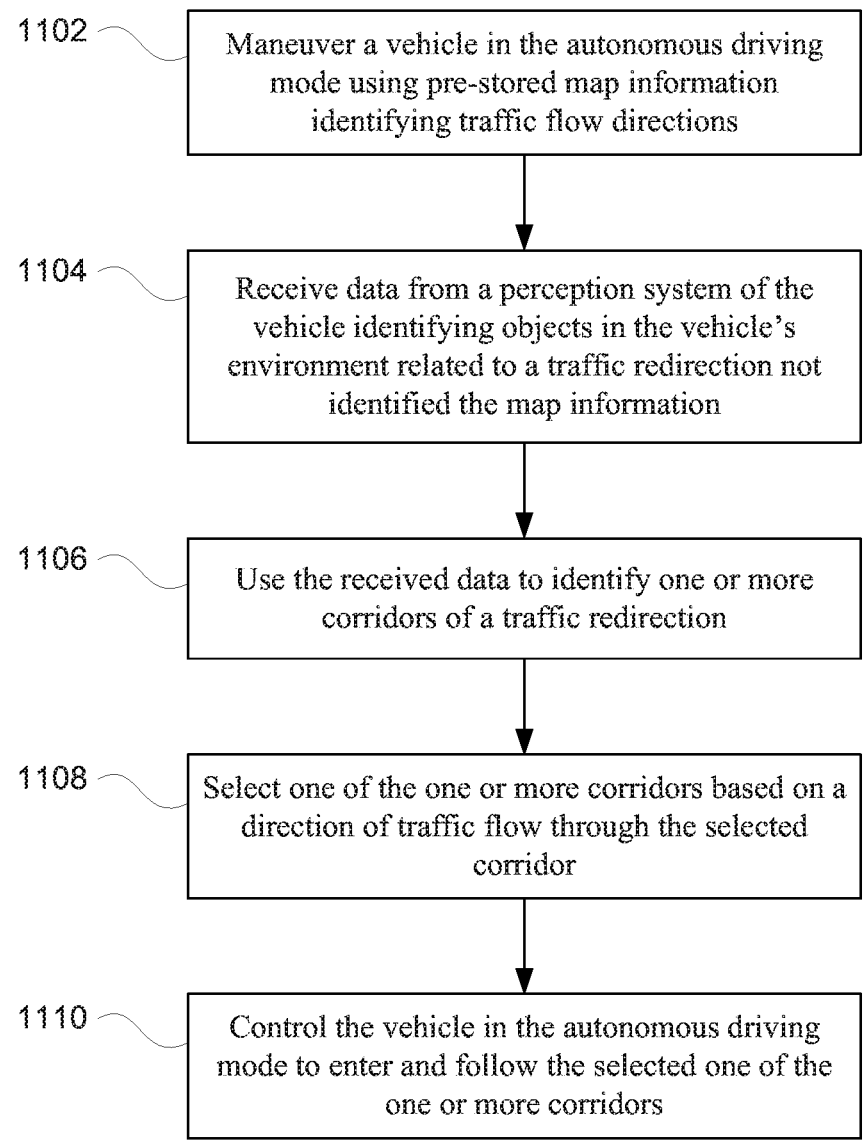
FIG. 11 is a flow diagram in accordance with aspects of the disclosure.

FIG. 11 is a flow diagram 1100 that may be performed by one or more processors, such as one or more processors 120 of computing device 110 in order to control a vehicle in an autonomous driving mode. At block 1102, the vehicle is maneuvered in the autonomous driving mode using pre-stored map information identifying traffic flow directions. At block 1104, data from a perception system of the vehicle identifying objects in an external environment of the vehicle related to a traffic redirection not identified the map information is received. At block 1106, the received data is used to identify one or more corridors of a traffic redirection. At block 1108, one of the one or more corridors is selected based on a direction of traffic flow through the selected corridor. At block 1110, the vehicle is controlled in the autonomous driving mode to enter and follow the selected one of the one or more corridors.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of controlling a vehicle in an autonomous driving mode, the method comprising:
    maneuvering, by one or more processors, a vehicle in the autonomous driving mode using pre-stored map information identifying traffic lanes;
    receiving, by the one or more processors, data from a perception system of the vehicle identifying objects in an external environment of the vehicle related to a traffic redirection at a given location different from the traffic lanes of the pre-stored map information;
    using, by the one or more processors, the received data to identify two or more corridors of the traffic redirection;
    determining, by the one or more processors, a traffic flow direction of a first corridor of the two or more corridors;
    rejecting, by the one or more processors, the first corridor of the two or more corridors based at least in part on the traffic flow direction of the first corridor;
    selecting, by the one or more processors, a second corridor of the two or more corridors; and
    controlling, by the one or more processors, the vehicle in the autonomous driving mode to enter and follow the second corridor of the two or more corridors.

2. The method of claim 1, wherein the second corridor is not defined by lane lines.

3. The method of claim 1, further comprising determining, by the one or more processors, a traffic flow direction of the second corridor, and
    wherein the second corridor corresponds to a path of a traffic lane identified in the pre-stored map information for the given location, but the traffic flow direction of the traffic lane as identified in the pre-stored map information for the given location is different than the determined traffic flow direction of the second corridor.

4. The method of claim 1, wherein determining the traffic flow direction of the first corridor is based at least in part on a determination, by the one or more processors, that opposing traffic would choose the first corridor.

5. The method of claim 1, wherein determining the traffic flow direction of the first corridor is based at least in part on an analysis, by the one or more processors, of one or more signs proximate to the first corridor.

6. The method of claim 5, wherein the analysis of the one or more signs proximate to the first corridor includes performing, by the one or more processors, optical character recognition to identify text on the one or more signs.

7. The method of claim 5, wherein the analysis of the one or more signs proximate to the first corridor includes determining, by the one or more processors, an orientation of the one or more signs relative to the first corridor.

8. The method of claim 1, wherein determining the traffic flow direction of the first corridor is based at least in part on a determination, by the one or more processors, that opposing traffic is passing through the first corridor.

9. The method of claim 1, further comprising determining, by the one or more processors, a road surface condition of the first corridor, and
    wherein rejecting the first corridor of the two or more corridors is based at least in part on the road surface condition of the first corridor.

10. The method of claim 9, wherein the road surface condition of the first corridor includes one or more of a trench, a drop-off of a predetermined height, or an unpaved road surface.

11. A system for controlling a vehicle in an autonomous driving mode, the system comprising one or more processors configured to:
    maneuver a vehicle in the autonomous driving mode using pre-stored map information identifying traffic lanes;
    receive data from a perception system of the vehicle identifying objects in an external environment of the vehicle related to a traffic redirection at a given location different from the traffic lanes of the pre-stored map information at the given location;
    use the received data to identify two or more corridors of the traffic redirection;
    determine a traffic flow direction of a first corridor of the two or more corridors;
    reject the first corridor of the two or more corridors based at least in part on the traffic flow direction of the first corridor;
    select a second corridor of the two or more corridors; and
    control the vehicle in the autonomous driving mode to enter and follow the second corridor of the two or more corridors.

12. The system of claim 11, wherein the one or more processors are further configured to determine the traffic flow direction of the first corridor based at least in part on a determination that opposing traffic would choose the first corridor.

13. The system of claim 11, wherein the one or more processors are further configured to determine the traffic flow direction of the first corridor based at least in part on an analysis of one or more signs proximate to the first corridor.

14. The system of claim 13, wherein, as a part of the analysis of the one or more signs proximate to the first corridor, the one or more processors are further configured to perform optical character recognition to identify text on the one or more signs.

15. The system of claim 13, wherein, as a part of the analysis of the one or more signs proximate to the first corridor, the one or more processors are further configured to determine an orientation of the one or more signs relative to the first corridor.

16. The system of claim 11, wherein the one or more processors are further configured to determine the traffic flow direction of the first corridor based at least in part on a determination that opposing traffic is passing through the first corridor.

17. The system of claim 11, wherein the one or more processors are further configured to:
    determine a road surface condition of the first corridor, and
    reject the first corridor of the two or more corridors based at least in part on the road surface condition of the first corridor.

18. The system of claim 11, further comprising the vehicle.

\* \* \* \* \*